(12) United States Patent
Johnson (10) Patent No.: US 7,188,635 B2
(45) Date of Patent: Mar. 13, 2007

(54) PORTABLE HUNTER'S SHED

(76) Inventor: David Johnson, 1533 Jolly Dr., Horton, AL (US) 35980

( * ) Notice: Subject to any disclaimer, the term of this patent is extended or adjusted under 35 U.S.C. 154(b) by 514 days.

(21) Appl. No.: 10/746,490

(22) Filed: Dec. 26, 2003

(65) Prior Publication Data

US 2004/0177571 A1  Sep. 16, 2004

Related U.S. Application Data

(60) Provisional application No. 60/436,611, filed on Dec. 27, 2002.

(51) Int. Cl.
*A01M 31/02* (2006.01)

(52) U.S. Cl. .......................... 135/87; 135/901; 52/79.5; 52/143; 43/1

(58) Field of Classification Search .............. 52/122.1, 52/143, 164, 79.5, DIG. 14; 135/901, 900, 135/87, 121; 187/243; 296/173; D25/16, D25/33, 62; 43/1
See application file for complete search history.

(56) References Cited

U.S. PATENT DOCUMENTS

| | | | | |
|---|---|---|---|---|
| 2,854,705 A | * | 10/1958 | McClaran | 52/206 |
| 3,256,860 A | * | 6/1966 | Parker | 119/498 |
| 3,473,627 A | * | 10/1969 | Repka | 182/16 |
| 3,985,254 A | * | 10/1976 | Grandury | 414/498 |
| 4,606,142 A | * | 8/1986 | Reneau | 43/1 |
| 4,782,616 A | | 11/1988 | Hambleton | |
| 5,102,179 A | * | 4/1992 | Royer | 296/26.06 |
| 5,210,984 A | * | 5/1993 | Eckel | 52/79.5 |
| 5,327,993 A | * | 7/1994 | Stark, Sr. | 182/129 |
| 5,339,852 A | | 8/1994 | Bull | |
| 6,009,673 A | * | 1/2000 | Adams | 52/79.1 |
| 6,148,836 A | | 11/2000 | Cananzey | |

* cited by examiner

*Primary Examiner*—Robert Canfield
(74) *Attorney, Agent, or Firm*—Melvin K. Silverman; Yi Li

(57) ABSTRACT

A portable pre-fabricated sports and hunting shed includes a substantially solid rectangular structure having an integral projecting element attachable to any standard trailer hitch and, at an opposite longitudinal end thereof, a pair of wheels, an adjoining axle, and means for journaling the axle, which means is attached to a base of the shed to thereby provide a rear wheel means by which the sports shed may be towed by a vehicle to which the trailer hitch is attached. Alternatively, the portable, prefabricated hunter's blind may be placed within a pickup truck to be hauled thereby. A four-wheel, off-road vehicle is placed within the portable shooting shed and over four disassembled legs of the assembly and other elements associated with the shed. By positioning the four-wheel off-road vehicle on top of all elements of the shed, the undesirable movement of the parts of the pre-fabricated structure during hauling is minimized.

9 Claims, 13 Drawing Sheets

PORTABLE HUNTER'S SHED

CROSS REFERENCE TO RELATED APPLICATION

This application claims the priority of provisional patent application No. 60/436,611 filed Dec. 27, 2002, which is hereby incorporated by reference in its entirety.

BACKGROUND OF THE INVENTION

The present invention relates to a portable and prefabricated hunting shed that can be transported to the intended hunting location in the bed of a standard pick-up truck or which may itself be transported in the fashion of a trailer.

Portable blinds, inclusive of sports sheds, have long been used for the observing, photographing, and hunting of birds and other animals in their natural habitat.

Such portable blinds range in size from structures that may be transported as a backpack (see U.S. Pat. No. 4,782,616 (1988) to Hambleton) to larger structures of a permanent character that may be transported upon the bed of a pickup truck (see U.S. Pat. No. 5,339,852 (1994) to Bull). Between these extremes are portable hunting blinds of a semi-permanent nature as is reflected in U.S. Pat. No. 6,148,836 (2000) to Cananzey.

Where the intended primary purposes of a sports shed is hunting, it is important to achieve the greatest possible elevation to thereby provide to the hunter the best perspective from which to observe his prey. Accordingly, the elevation achievable by the hunter from a blind or sport shed is a key consideration in its utility, as is the ease of portability of the blind to its eventual location. The prior art, as is best known to the within inventor, does not provide for a portable prefabricated sports shed which affords to the sportsman sufficient height from which to observe animal activities of interest, that is, heights in the range of 7 to 10 feet above the ground. The present invention addresses this long-felt need in the area of portable prefabricated hunting sheds.

SUMMARY OF THE INVENTION

A portable pre-fabricated sports and hunting shed, in accordance with the instant invention, includes a substantially solid rectangular structure having an integral projecting element attachable to any standard trailer hitch and, at an opposite longitudinal end thereof, a pair of wheels, an adjoining axle, and means for journaling said axle, which means is attached to a base of the shed to thereby provide a rear wheel means by which the sports shed may, if desired, be towed by a vehicle to which said trailer hitch is attached. Alternatively, the invention, the portable, prefabricated hunter's blind may be placed within the flat bed of a pickup truck to be hauled thereby. In this embodiment, a four-wheel, off-road vehicle is placed within the portable shooting shed and over four disassembled legs of the assembly and other elements associated with the shed. By so positioning the four-wheel off-road vehicle on top of all elements of the shed to be at the hunting location, the possibility of undesirable movement of the parts of the pre-fabricated structure, during the hauling process, is minimized.

Upon arrival of the hunting site, an unassembled wall of the hunting shed is used as an inclined surface to enable the four-wheel vehicle to pull the hunting shed off of the pickup truck and effect the assembly thereof in the manner set forth below. Said shed, when fully assemble, constitutes a solid rectangular structure having a longitudinal vertical axis, an internal volume in which one or more hunters may stay, and a roof structure upon which one may, from a greater height, observe the surrounding landscape. Separate ladders are provided for access to the internal area of the structure and to the roof thereof, and slit-like windows are provided from which a sportsman may observe the surrounding area when he is located within the resulting vertical solid rectangular structure of the invention.

It is therefore an object of the present invention to provide a portable, partially, pre-fabricated sports and hunting shed that may be transported either as trailer or within the bed of a standard pickup truck.

It is another object to provide a hunting shelter, in the nature of a shooting house, that may be fabricated on-site and provides to the sportsman an altitude in the range of 7 to 10 feet above the ground.

It is a still further object of the invention to provide a prefabricated hunting shelter or sports shed that may be readily transported, easily assembled and disassembled, which can conceal a hunter from a prey, and provide protection to the hunter or sportsman for inclement weather and temperatures.

It is still further object to provide a partially prefabricated hunting shelter that may, together with a four-wheel, off-road vehicle, be readily placed within and transported by a standard pickup truck.

It is a still further object to provide a hunting shed of the above type which provides for uses by the sportsman, both internally thereof, and in the use of the roof of such a shed as an additional point of observation, however at a greater elevation from the internal surface thereof.

The above and yet other objects and advantages of the present invention will become apparent from the hereinafter set forth Brief Description of the Drawings and Detailed Description of the Invention.

DETAILED DESCRIPTION OF THE INVENTION

Figure 1:
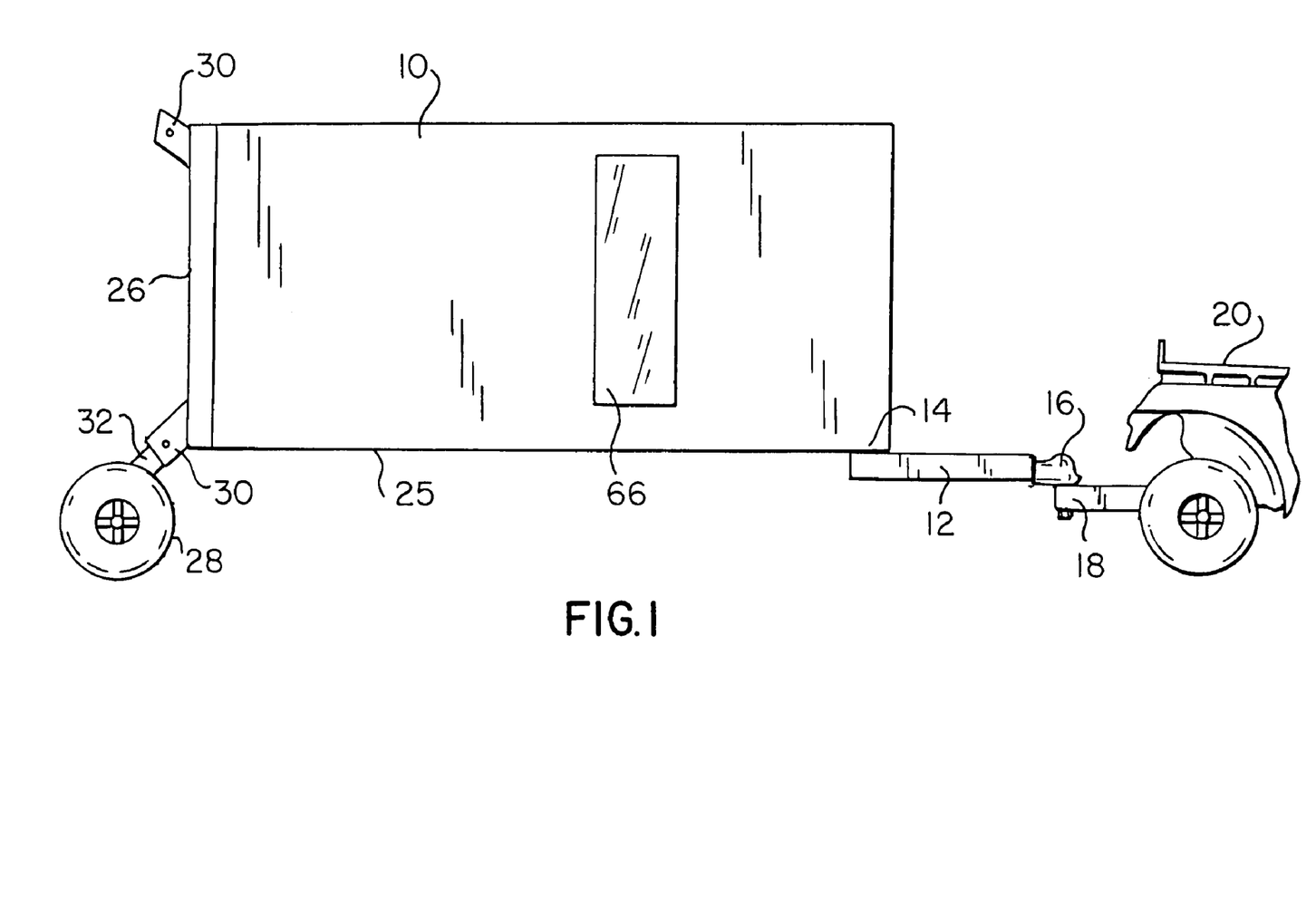
FIG. 1 is a schematic view showing the partially pre-fabricated support shed transported as a trailer.
Figure 2:
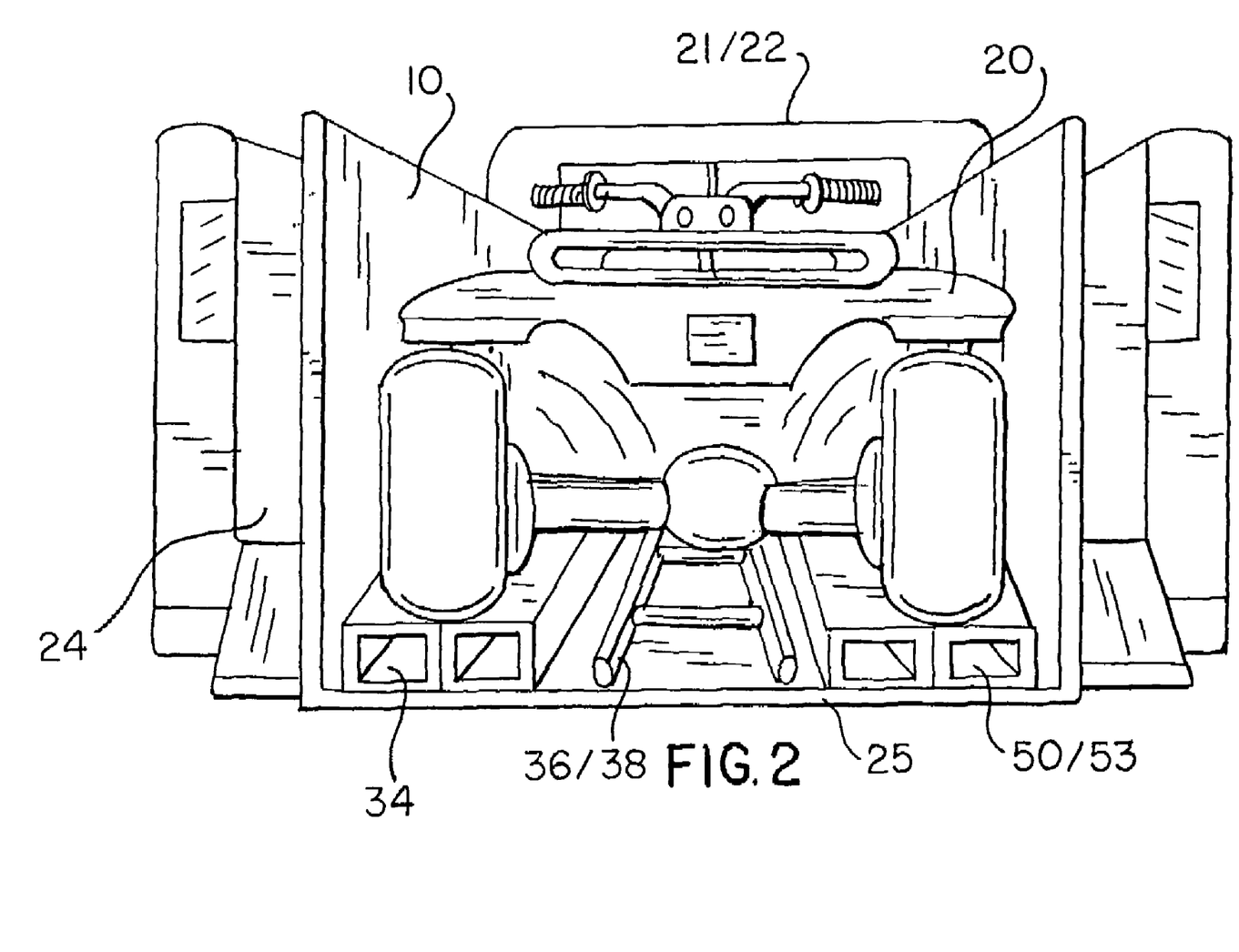
FIG. 2 is a rear schematic view showing placement of the inventive shed upon the flatbed of a pickup truck in which a four-wheel, off-track vehicle is placed in the shed therein and is used to secure legs and ladders of the sports shed to be later assembled therewith.
Figure 2A:
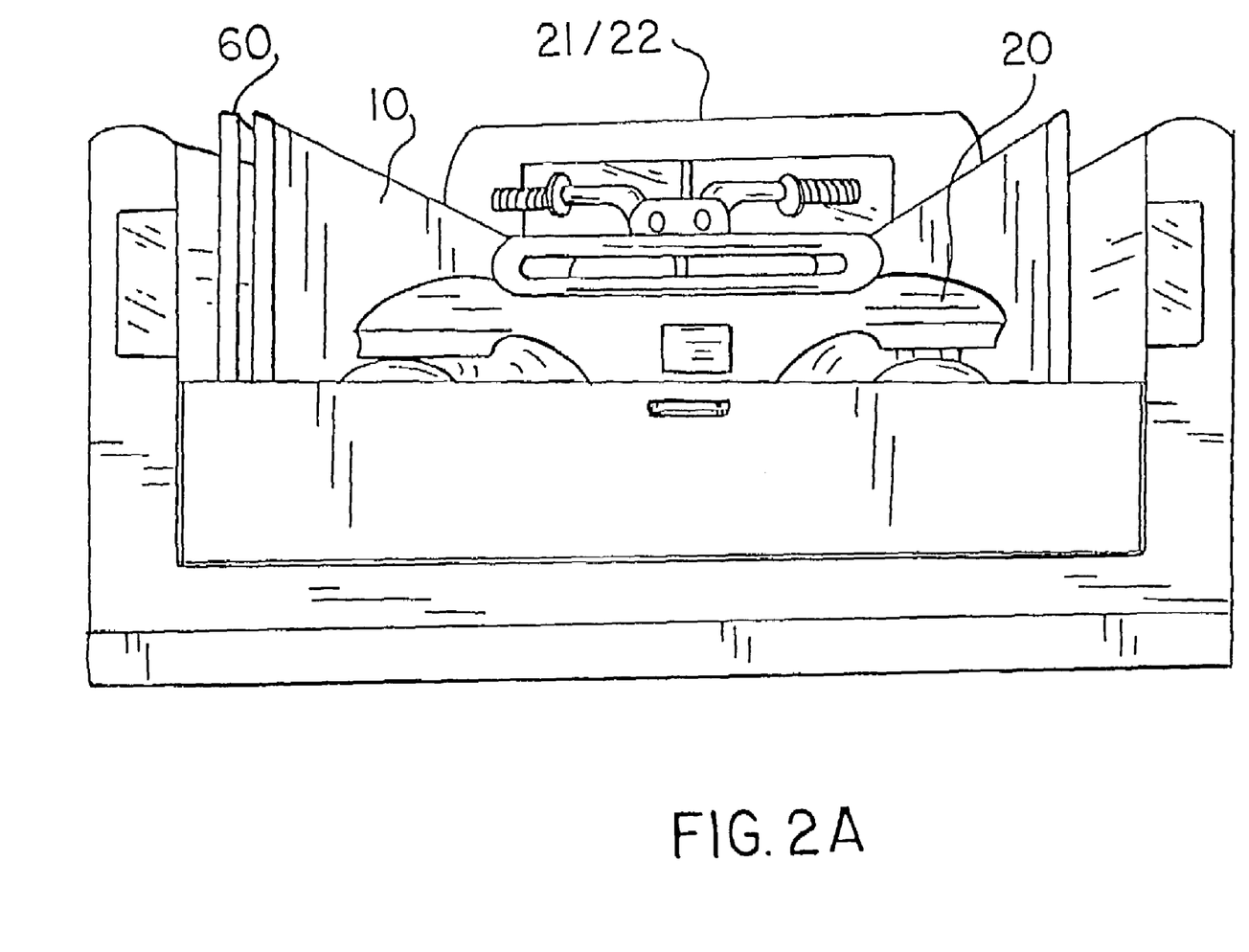
FIG. 2A is a rear view sequential to that of FIG. 2.

With reference to the views of FIGS. 1 and 2, there is shown a first embodiment of the present invention, the same including a partially fabricated sports shed 10 including a trailer hitch bar 12 integrally secured at a surface 14 to the shed and, at an opposite end of bar 12, provided with a trailer hitch 16 that may be secured to any trailer hitch ball assembly 18 of any vehicle which may comprise either a four-wheel off-road vehicle 20 or a pickup truck 22. See FIG. 2.

Said shed includes a sidewall 25, bottom or base panel 26 and window 66. The inventive shed is seen to also include four base-to-leg connectors 30 connected to the bottom of the base panel 26 at four corners. The base-to-leg connectors 30 are substantially rectangular hollow integral sheath, which, as is noted below, may serve several purposes inclusive of that of securing said wheel set 28 and an axle journaling element 32 to therebetween.

In a most common anticipated use of the present invention, the structure shown in FIG. 1 will be placed within a flat bed 24 of said pickup truck 22 (see FIGS. 2 and 3) in which shed wall 25 is placed on flat bed 24 with shed bottom 26 and wheel set 28 toward the cab 21 of the truck 22.

As may be noted in FIG. 2, after the partially fabricated shed 10 is placed with flat bed 24 of the pickup truck 22, said four-wheel vehicle 20 is placed upon legs 50 (later more fully described) and ladders 36/38.

Figure 3:
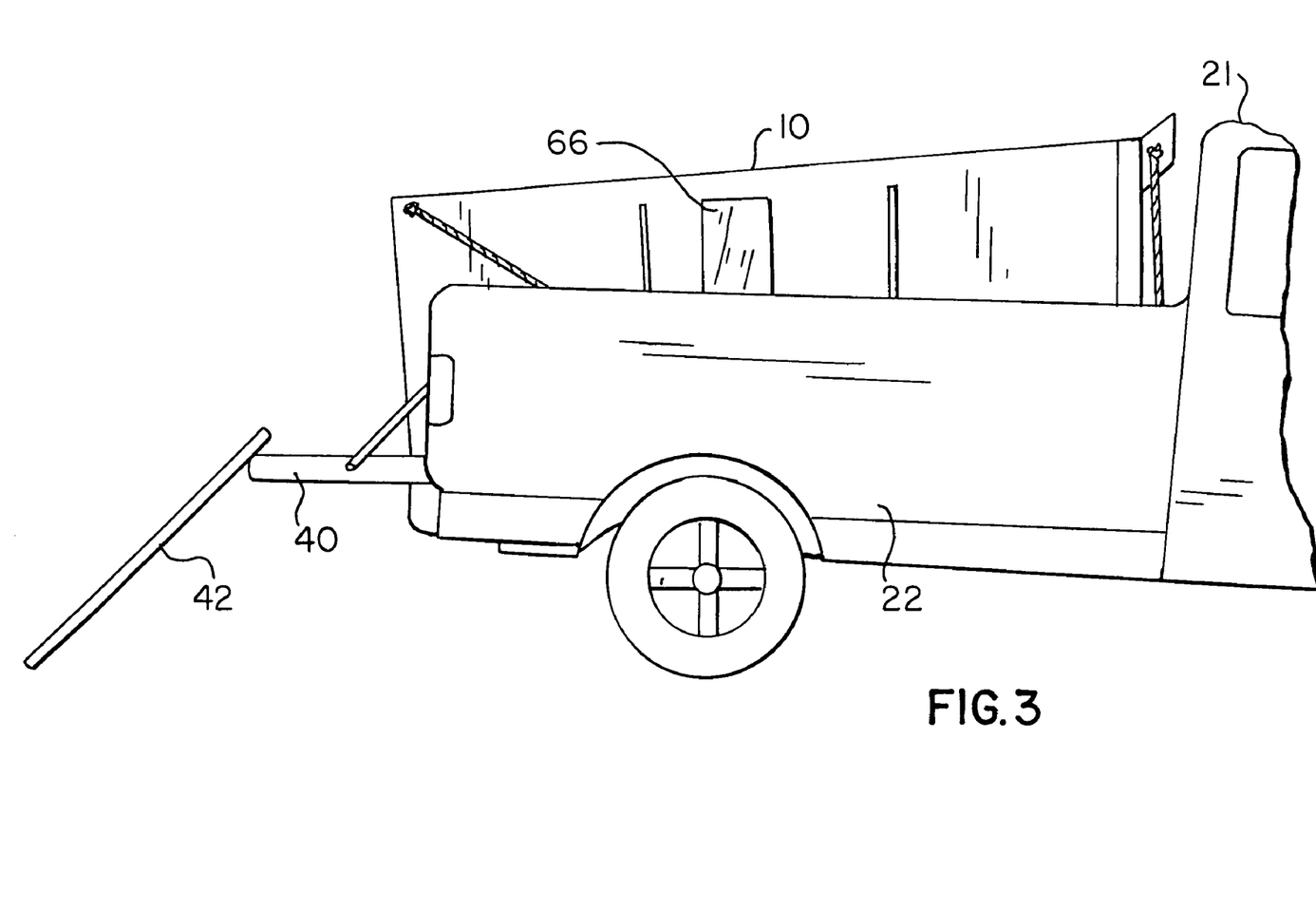
FIG. 3 is a view, sequential to that of FIG. 2, showing the use of an unattached wall of the shed as inclined plane to facilitate removal of the four-wheel vehicle from the sports shed after it has been hauled to its destination.
Figure 4:
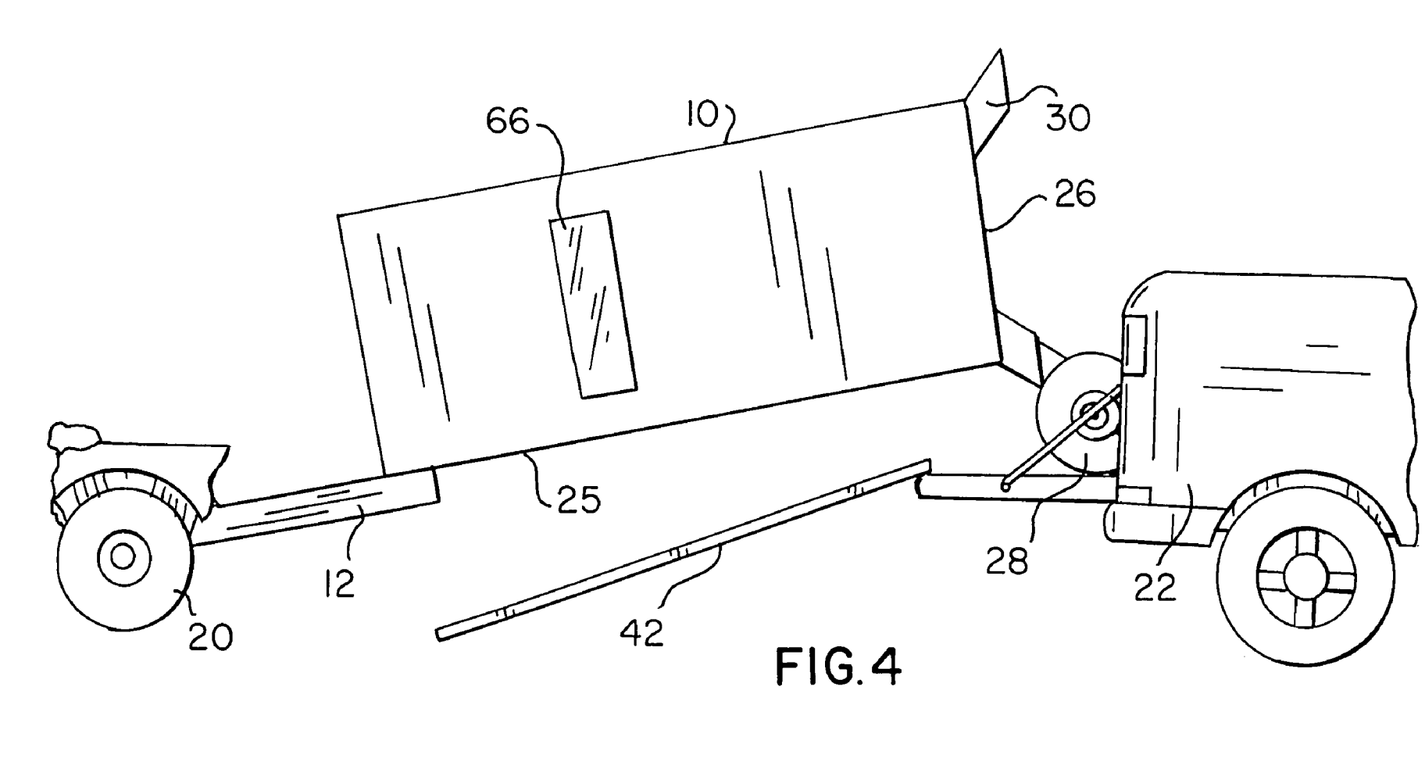
FIG. 4 is a view, sequential to that of FIG. 3, showing removal of the sports shed from the pickup truck by means of the four-wheel off-road vehicle.

In the view of FIG. 3, the sportsman or user has reached the hunting or observation destination and, therefore, has flipped downward back panel 40 of the pickup truck 22 and placed an unsecured wall 42 of the shed at the end thereof to thereby provide an inclined plane which, as is shown in FIG. 4, may be used to readily remove the partially fabricated shed from the pickup truck 22.

Figure 5:
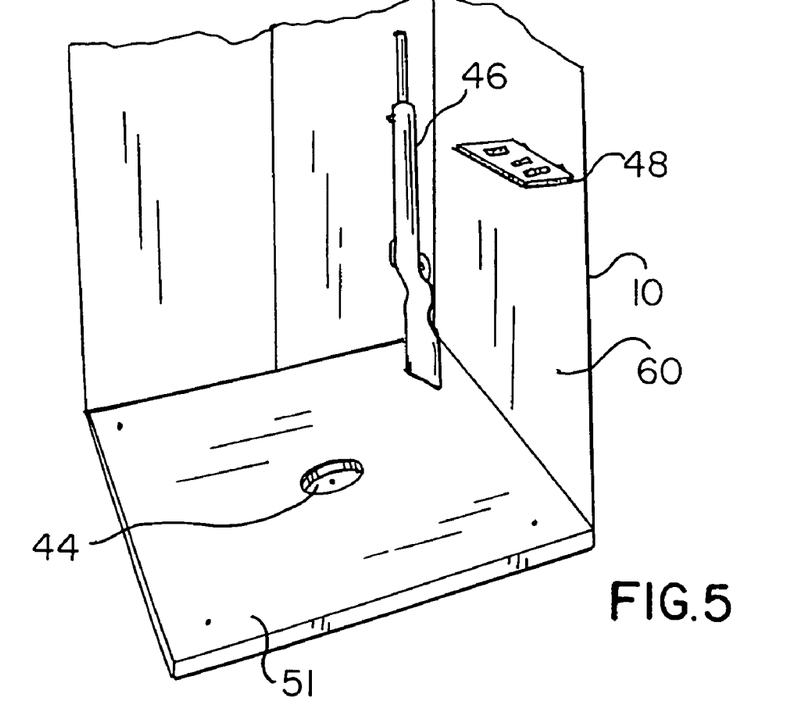
FIG. 5 is a schematic view of the partially assembled shed showing the storage of a rifle therein.

In the appearance of the inside of the partially fabricated shed 10, shown in FIG. 5, is a drainage hole 44 within said bottom surface 26. Also shown therein is a rifle 46, a rack 48 upon which said rifle, as well as other useful articles may be placed.

Figure 6:
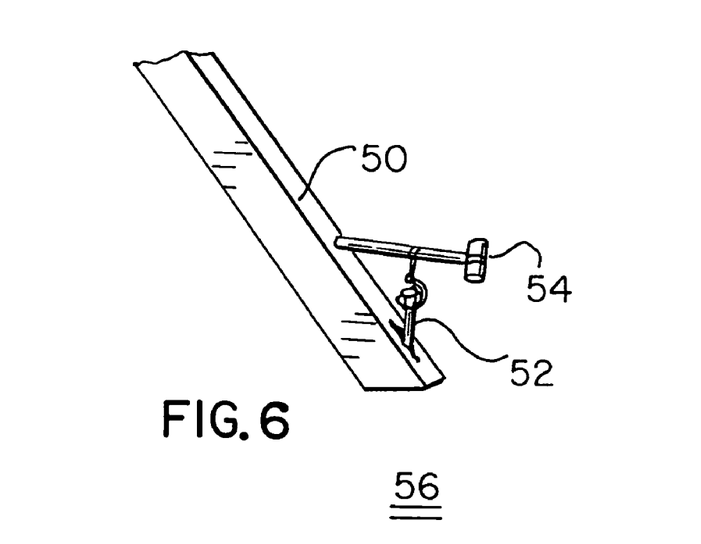
FIG. 6 is a schematic view of a supporting leg of the shed structure and means for securing the same into the ground.
Figure 7:
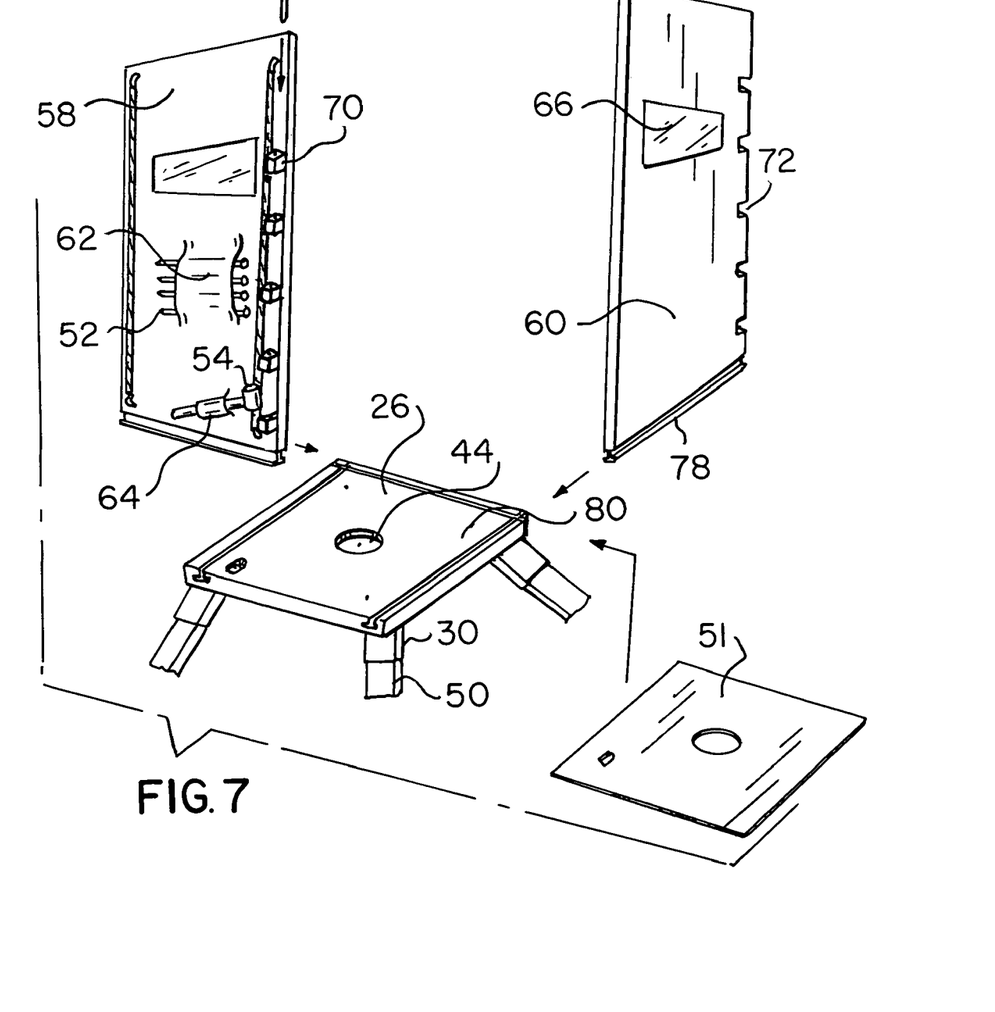
FIG. 7 is an exploded view showing a base of the inventive sports shed, two walls thereof, a ceiling panel, and complemental pole elements that may be employed to secure the vertical panels to each other.

In FIG. 6 is shown said a leg 50, a stake 52, and a hammer 54 which can be detached from leg 50 and used to hammer stake 52 into the ground 56. In FIG. 7 are shown vertical walls 58 and 60 of the inventive structure, said bottom or base 26 thereof, said leg 50, said base-to-leg connector 30, and base panel cover 51.

Figure 7A:
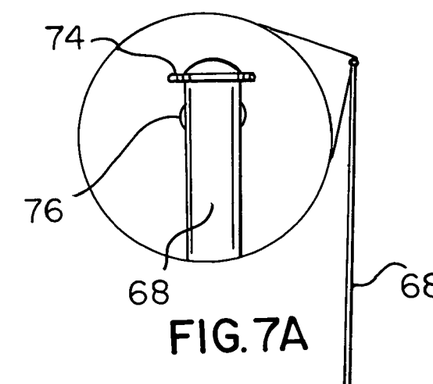
FIG. 7A is an enlarged view of the top of the pole element shown FIG. 7.

In FIG. 7 is shown organizational means 62 which may be used to hold said stakes 52 during the transport of the unit, as well as a holding means 64 which hammer 54 may be held. Also shown therein are said windows 66 with which each walls is provided. Also shown in FIG. 7 are poles 68, an upper part of which is shown in greater detail in FIG. 7A. Said poles are placed through a vertical linear sequence of collar elements 70, in combination with complemental female elements 72 to thereby secure walls 58 and 60 to each other at the vertical corners thereof. Shown, in the enlarged view of FIG. 7A, are the tops of each pole 68 and, therein, male elements 74 and 76 which serve to lock poles 68 in place after they are inserted within collars 70. Further shown in FIG. 7 is lower horizontal male element 78 of panel 60 and complemental female elements 80 associated with bottom or base panel 26. Thereby, the vertical panels 60 are secured to the bottom or base panel 26 of the structure.

Figures 8, 8A, 9:
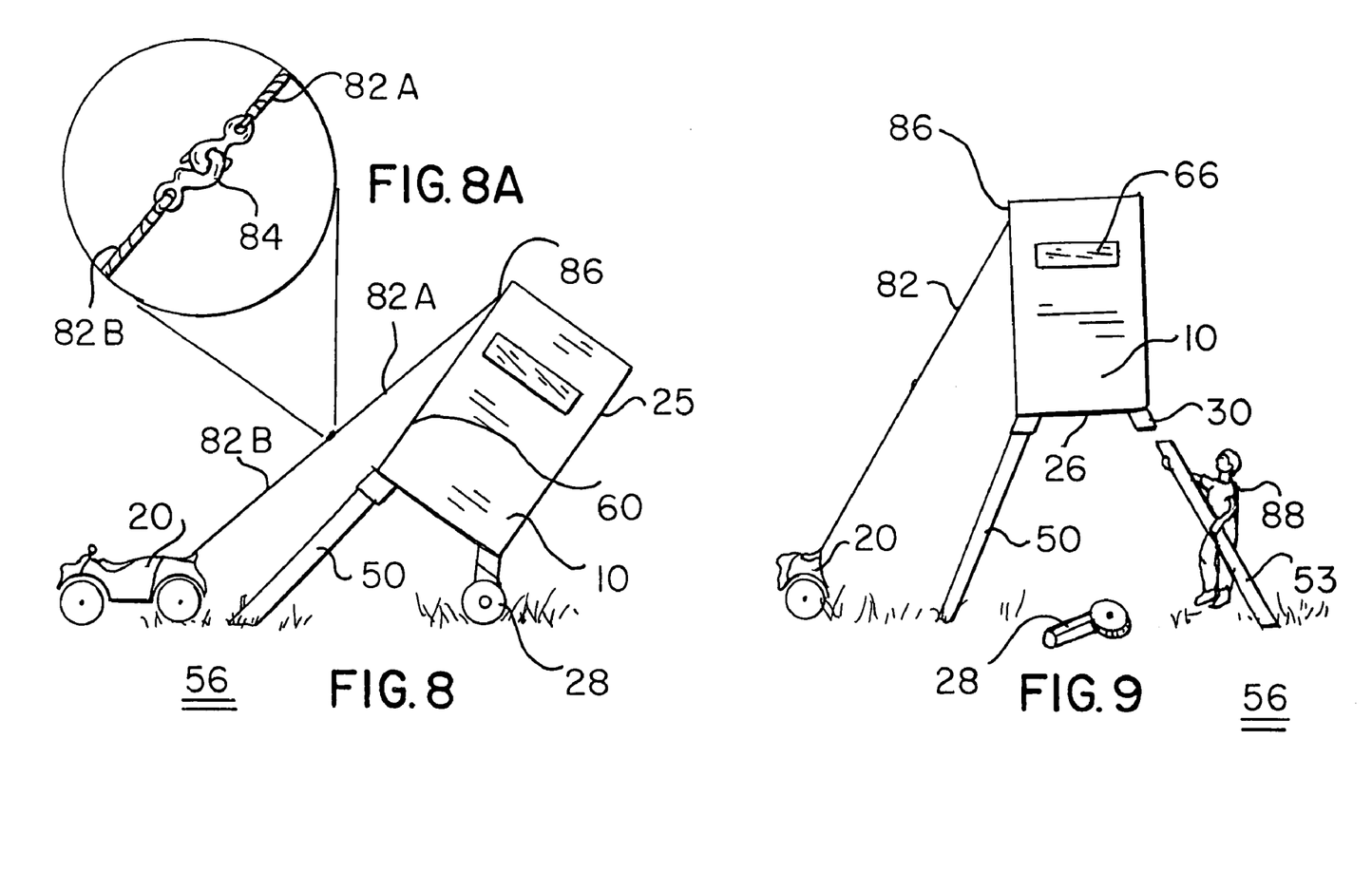
FIG. 8 is a schematic view showing the manner in which the four-wheel off-road vehicle may be used to enable a single person to assemble the inventive hunting shed.
FIG. 8A is an enlarged view of a cable connecting means used in the view of FIG. 8.
FIG. 9 is a view, sequential to that of FIG. 8, further showing the manner in which the off-track vehicle may be used to enable a single sportsman to assemble the inventive device at the desired location of use thereof.

In FIGS. 8 and 9 are shown the manner in which four-wheel vehicle 20 may be used to enable a single person to assemble the inventive structure at its field location. This includes use of two interlocking cables 82A and 82B (see FIG. 8A) and complemental hooks 84. As may be noted, a first end of cable 82A is attached to wall 60 at point 86 and is pulled by four-wheel vehicle 20 until the orientation shown in FIG. 9 is achieved. Thereupon, the sportsman 88 uses the four-wheel vehicle and places leg 53 into base-to-leg connector 30 which depends from lower surface 26 of the structure. Thereafter, all that remains is the securement of doors 92 of the structure, which is effected through the use of hinges 94 (see FIG. 10). Thereafter, an upper railing 96 (see FIGS. 10–14) is placed on a roof 90 of the structure.

Figure 10:
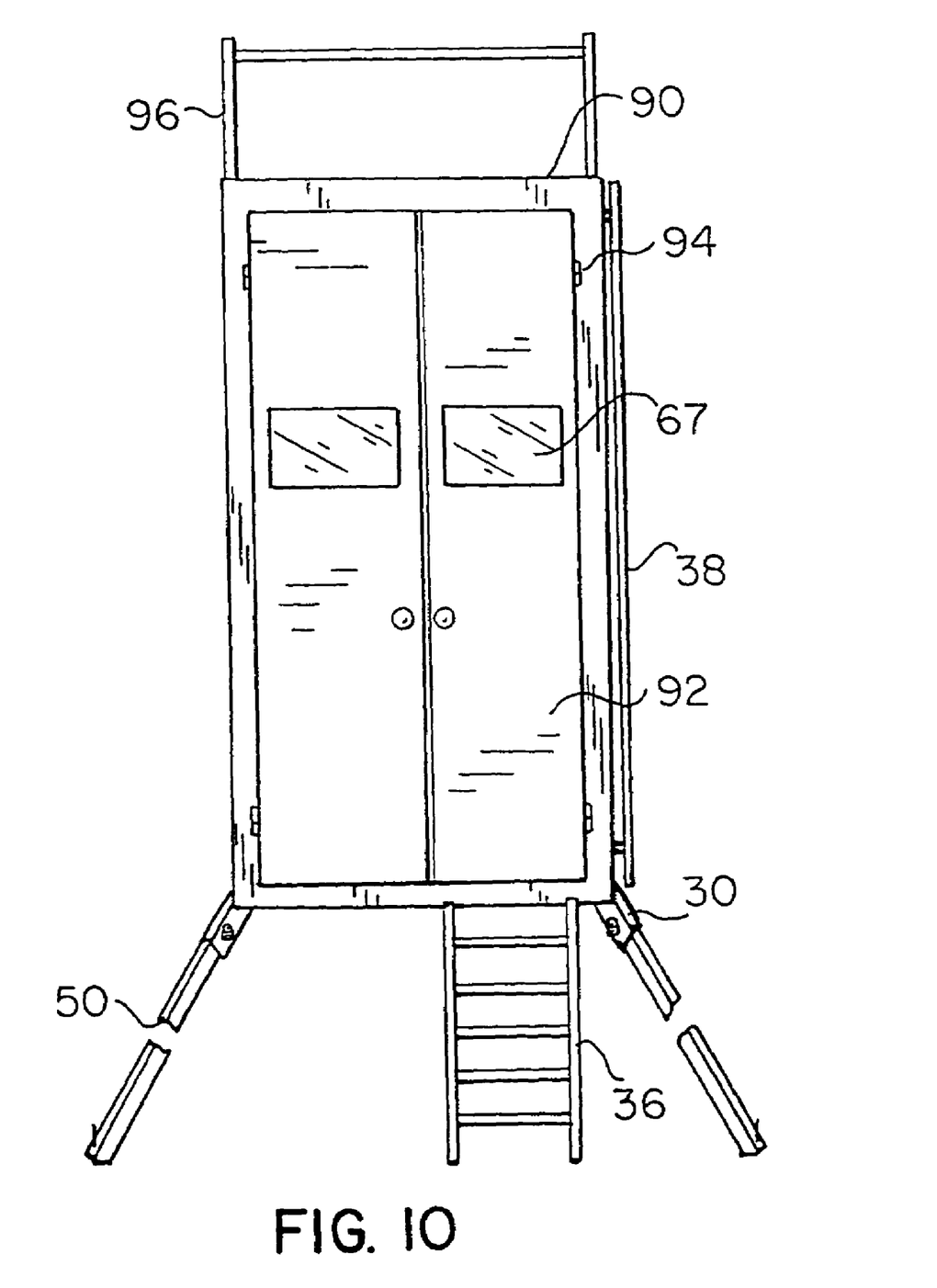
FIG. 10 is a front elevational view of the sports shed when assembled.
Figure 11:
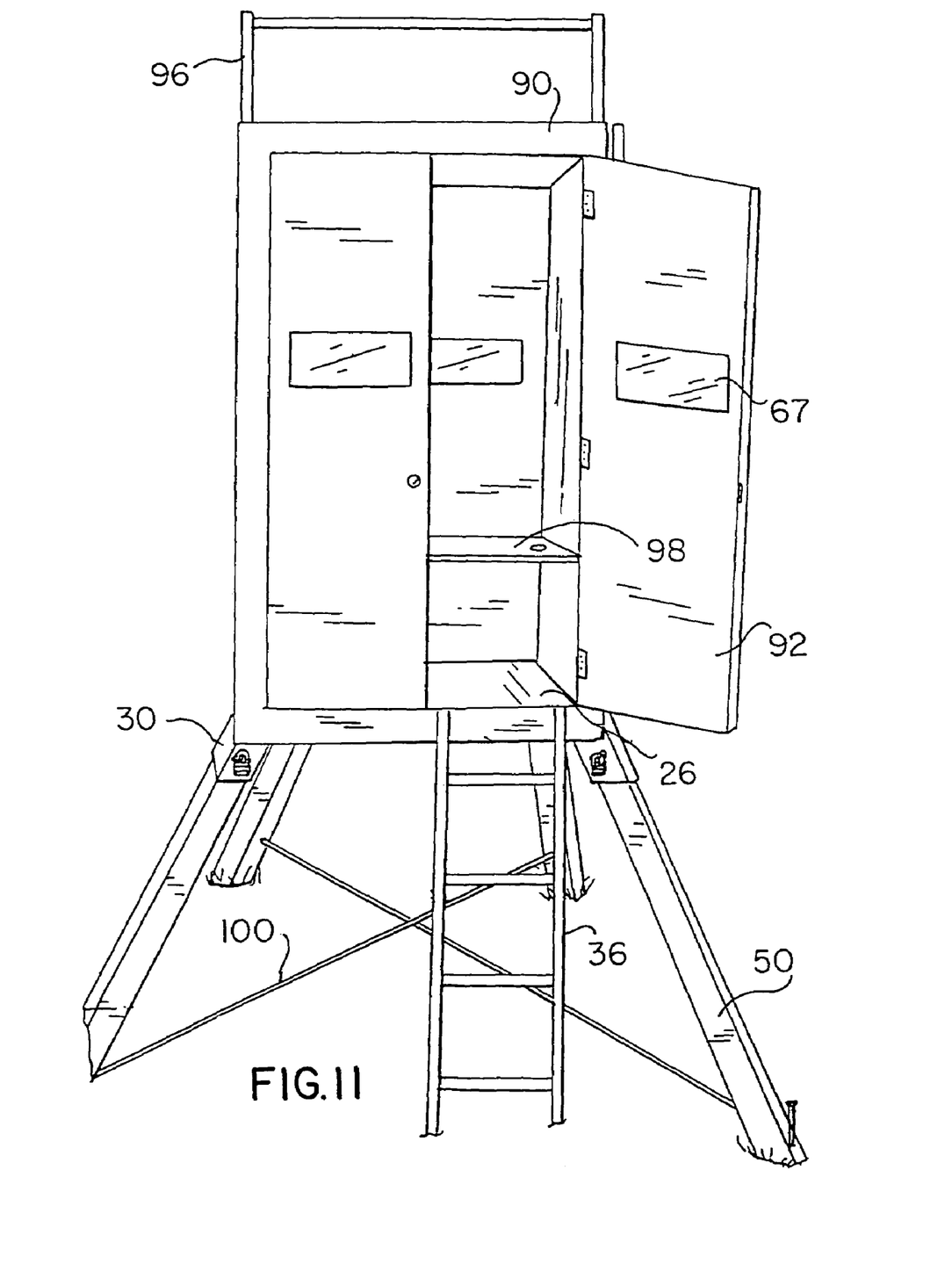
FIG. 11 is a perspective view, similar to that of FIG. 10, however showing the appearance thereof with one of the doors thereof in an open position.

In FIGS. 10 and 11 are shown smaller windows 67 (relative to said windows 66 of the other walls) which are used within doors 92 of the shed.

Figure 12:
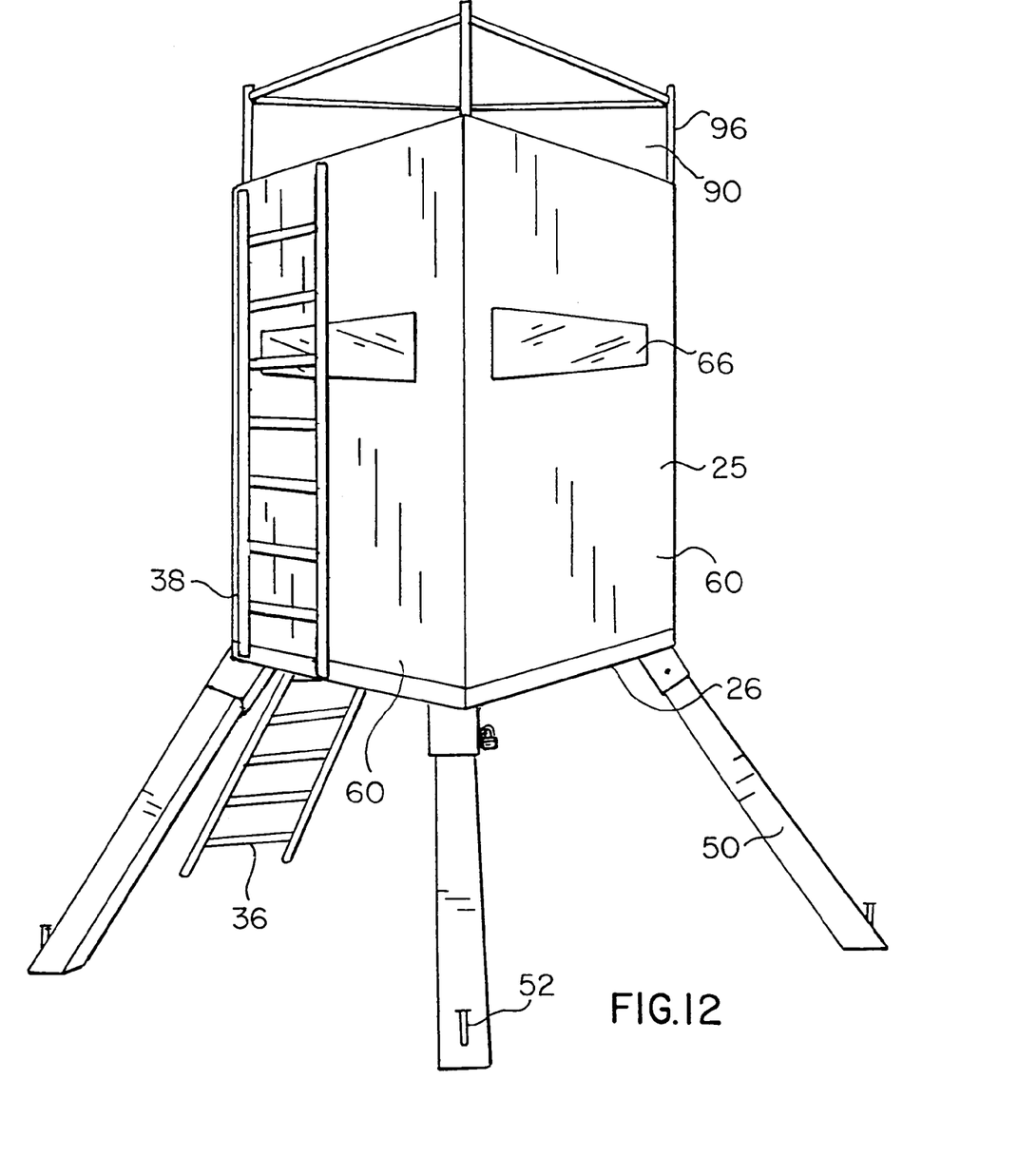
FIG. 12 is a side elevational view of the assembled shed.
Figure 13:
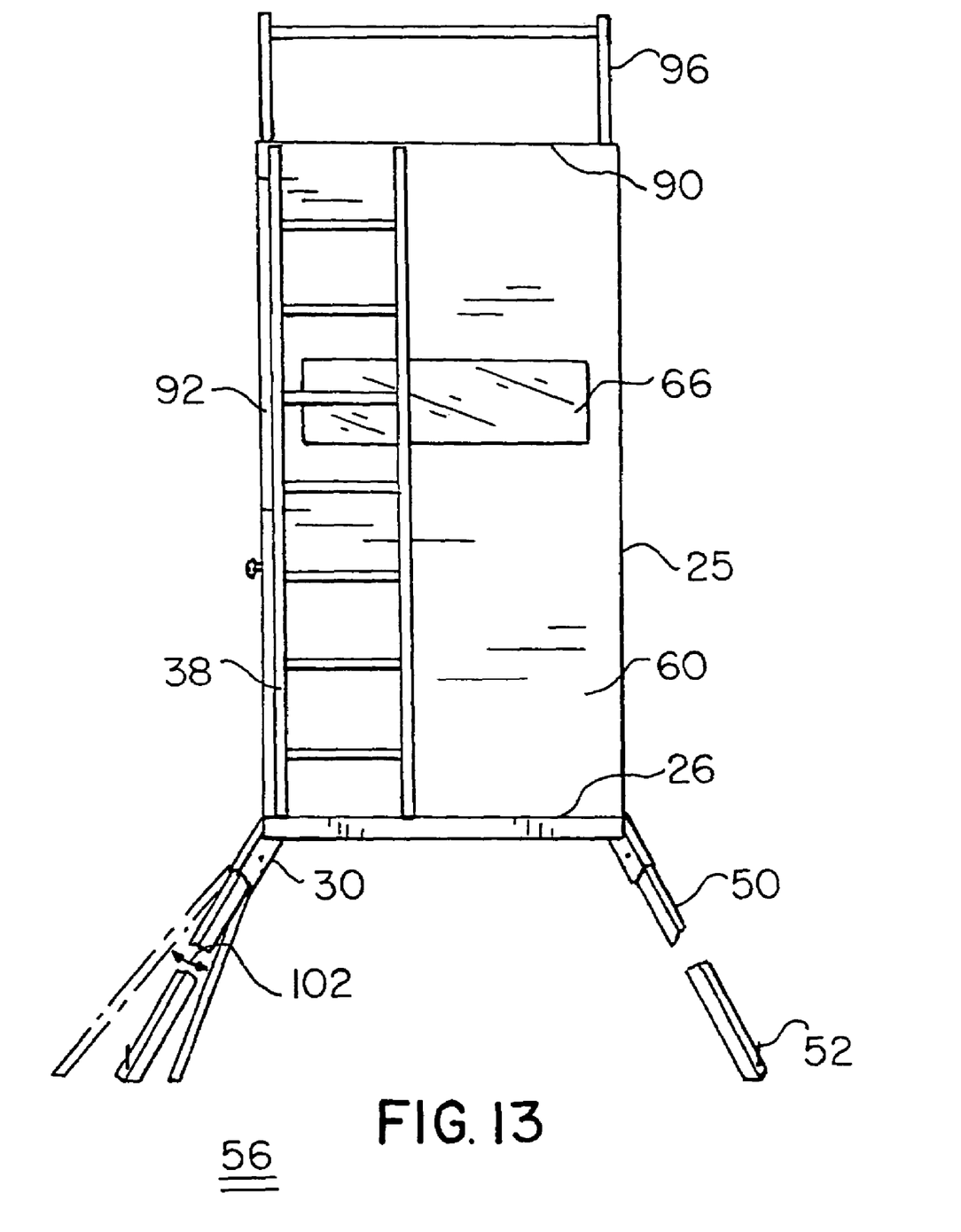
FIG. 13 is a right side view thereof, also showing possible variations in length and angle of the legs of the structure that may be accomplished.
Figure 14:
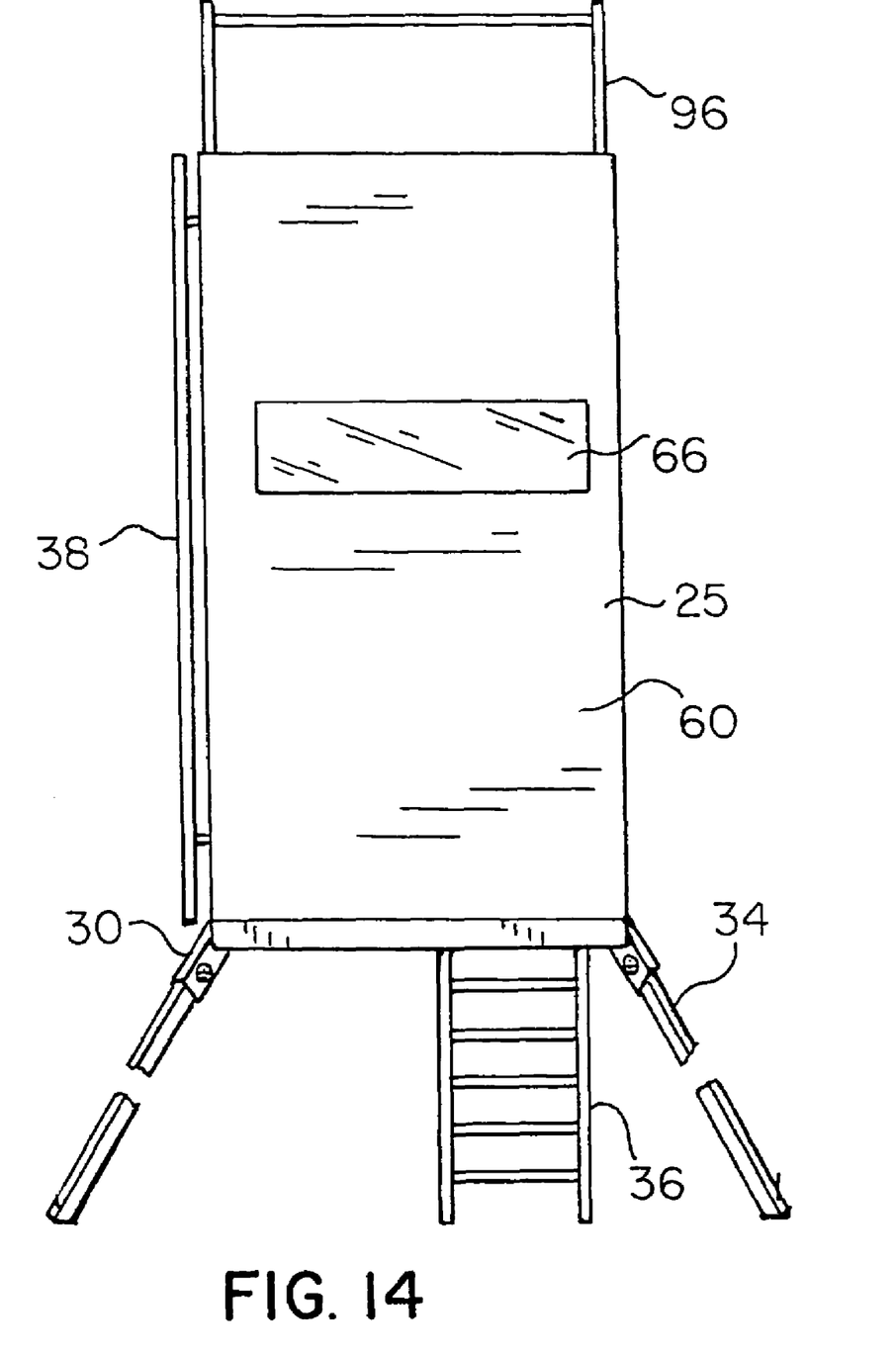
FIG. 14 is a back perspective view of the inventive sports shed.

In FIG. 11 is shown the appearance of the assembled structure, this including a roof 90 as well as cross cables 100 used to secure legs 50 in a fixed stable position relative to each other. Various perspective, side and back views of the assembled shed are shown in FIGS. 12, 13 and 14. In FIG. 13 is also shown the potential adjustability of the angulation of each leg 50 relative to the ground 56. It may, thereby, be appreciated that a degree of flexibility, as is reflected in angle 102, is engineered into the structure, as is the length of leg 50 which may be employed. However, in a preferred embodiment, an angle of about 60 degrees will exist between the axis of leg 50 and the plane of ground 56.

Through the above, there is provided a readily transportable and assembled, highly versatile portable hunting shelter and shed that may be transported either as a trailer (see FIG. 1) or complementally positioned upon a flatbed or a pickup truck as is shown and described in FIG. 2-4 above. Further, through the inclusion of a four-wheel off-road vehicle 20, a single individual may affect the assembly at the intended wilderness or hunting location is reached, as is shown in FIGS. 7–9.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth.

What is claimed is:

1. A portable pre-fabricated sports and hunting shed comprising:
   (a) two side panels and a back panel interconnected by interlocking mechanisms embedded in said side panels and back panel to form vertical side and back walls of said shed; each of said panels having a horizontal male element protruding from a bottom thereof and extending along entire width of each of said panels;

(b) a base in a square or rectangular shape, said base having three female slots on a top side thereof, extending along and near two side edges and a back edge of said base and said female slots being complementary to said male elements of said side and back panels; and said base having a drainage opening; wherein said base is connected to said side and back panels by inserting said male elements into said female slots;

(c) four base-to-leg connectors connected to a bottom side of said base; wherein said base-to-leg connectors are substantially rectangular hollow integral sheath;

(d) four removable legs in substantially rectangular shape complementary to said base-to-leg connectors for connecting to said base-to-leg connectors;

(e) a first ladder for connecting said base to the ground at a front of said base to assist a person entering said shed; and (f) two door panels, each to be connected to one of said side panels by hinges.

2. The portable pre-fabricated sports and hunting shed of claim 1 further comprising a roof at a top of said shed and one or more railing installed on said roof to provide a support to said person standing on said roof.

3. The portable pre-fabricated sports and hunting shed of claim 2 further comprising a second ladder to be attached to one of said side panels for said person to reach said roof.

4. The portable pre-fabricated sports and hunting shed of claim 3, wherein upon installation of said four removable legs a height at said top of said shed is from about 7 feet to about 10 feet above the ground, for hunters to view animal activities.

5. The portable pre-fabricated sports and hunting shed of claim 4, wherein said interlocking mechanisms embedded in said side panels and back panel comprise a series of collar elements spaced vertically along two edges of said back panel, each of said collar elements having a central hole; and a series of female elements spaced vertically along a back edge of each of said side panels and a hole near said back edge of said side panels, vertically through said female elements, said female elements having a shape complementary to said collar elements; and a locking pole; wherein when assembled, said collar elements are inserted into said female elements and said locking pole is inserted vertically into said holes to lock said panels together.

6. The portable pre-fabricated sports and hunting shed of claim 5, wherein said side, back and door panels further comprise windows.

7. The portable pre-fabricated sports and hunting shed of claim 6 further comprising a pair of cross cables for reinforcing said legs by connecting each two of said legs diagonally with said cross cables.

8. The portable pre-fabricated sports and hunting shed of claim 7, wherein an angle between each of said legs and the ground can be adjusted by a certain degree.

9. A method of setting up said portable sports and hunting shed of claim 1 in a sports or hunting field comprising the steps of:

(a) installing two of said legs into two of said base-to-leg connectors which are immediate adjacent;

(b) connecting two supporting wheels to said base by inserting an axle journaling element of each of said supporting wheels into each of two remaining base-to-leg connectors; wherein said supporting wheels are on an opposing side of said two legs;

(c) attaching one end of a pulling cable to a vehicle, and an opposing end to said top of said shed on a same side where said legs are connected;

(d) pulling said shed from an inclined position toward said wheels to a vertical position, and then pulling slightly further to have said shed slightly inclined toward said side of said installed legs;

(e) disconnecting said wheels, and installing two remaining legs into two remaining base-to-leg connectors; and (f) backing off said vehicle slightly to have said shed land on all four of said legs; and thereby said method enables setting up said shed with only one person.

* * * * *